UNITED STATES PATENT OFFICE.

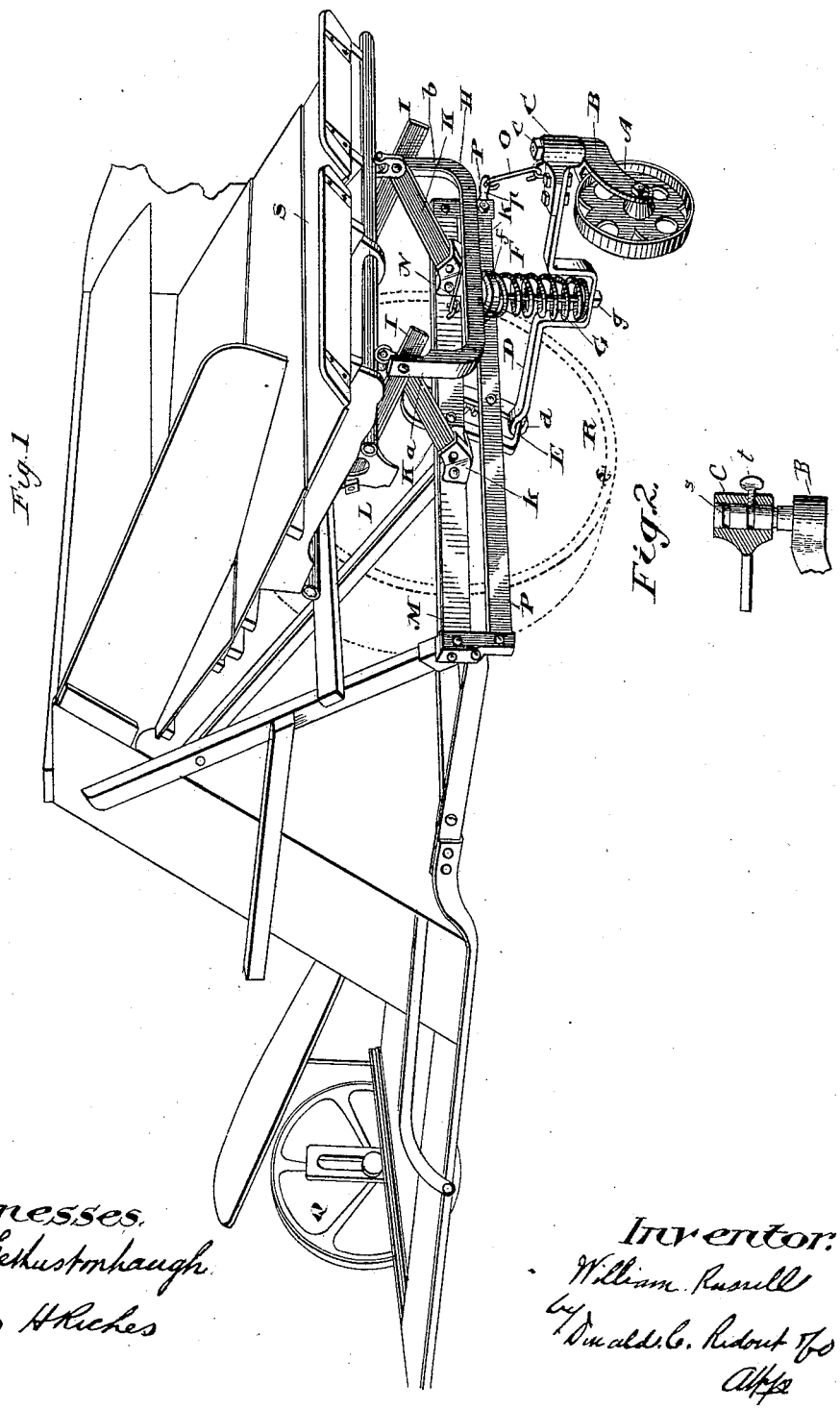

WILLIAM RUSSELL, OF HAMILTON, ONTARIO, CANADA.

HARVESTER.

SPECIFICATION forming part of Letters Patent No. 390,141, dated September 25, 1888.

Application filed August 22, 1887. Serial No. 247,563. (No model.) Patented in Canada August 26, 1887, No. 27,510.

*To all whom it may concern:*

Be it known that I, WILLIAM RUSSELL, of the city of Hamilton, in the county of Wentworth, in the Province of Ontario, Canada, gentleman, have invented certain new and useful Improvements in Harvesters, of which the following is a specification.

The object of the invention is to provide an attachment for harvesters in which the grain is elevated for use on side hills, so as to render it possible to operate machines on what has hitherto been found to be impracticable ground; and it consists, essentially, in so attaching a caster-wheel to the main frame on the discharging side of the machine as to afford a spring-bearing for a yoke, which supports the outer side of the main frame and of the deck from which the sheaves are discharged, and thus cause the center of gravity on steep ground to fall within this caster-wheel, as hereinafter more particularly described, the swivel or caster-wheel on the discharging side of the machine being adapted, when the machine is running on level ground, to rest on and roll over the ground, the spring not being compressed; but when the machine is working on a side hill (the grain-wheel on the highest part) so steep as to cause the center of gravity of the machine to fall outside the main wheel, the tipping of the machine on the main wheel causes the spring on the swivel or caster-wheel to be compressed and afford a spring-bearing for the outer side of the machine on the discharging side, the weight of the machine resting on the main wheel and swivel or caster-wheel, the said attachment being adapted for ready removal from the machine, if desired, when operating a level or comparatively level ground.

Figure 1 is a perspective view of my attachment. Fig. 2 is a sectional detail.

In Fig. 1, A is a small wheel, which is preferably a caster-wheel, journaled on the arms of the swivel B, which is adapted to work in the box C, which is bolted to the outer end of the extension-arm D, the swivel B being held in place by a shoulder formed thereon and a nut, *c*. The extension-arm D has a hook, *d*, formed on its inner end, which is hooked onto the lower end of the elevating-rack E, or otherwise attached to the frame of the machine. This arm is preferably U-shaped about the center, so as to form a bed for one end of the spiral spring F, the other end of the spring being attached to the head-block *f*.

G is a bolt the lower end of which passes through the extension-arm D, and having nut *g* screwed thereon. The upper end of the bolt passes through the head-block *f* and the yoke H, to which it is rigidly secured, so that when the spring is compressed the lower end of the bolt G, with the nut *g*, projects below the U-shaped portion of the extension-arm.

The yoke H is preferably made of angle-steel, and has standards *a* and *b*, which are bolted through and rigidly secured to the arms I and braces K, which form brackets for the support of the yoke H. The near arm I is shown bolted to the saddle L, secured to the under side of the deck, near the inner ends thereof; but these arms may be rigidly secured in any convenient manner to the main frame of the machine.

*k* are sockets bolted to the sill M. The braces K are rigidly secured in the sockets *k*, and the bolster or yoke H is pivotally connected with the arms I and the braces K at the upper end of the standards *a* and *b*, so as to permit of slight play.

N is a rod hooked into a staple on the sill M, and also hooked to the inner side of the yoke H, for the purpose of steadying it and holding it in proper position over the spring.

O is a link hooked onto the end of the metal portion P of the sill, or a casting, *p*, bolted to the end thereof, and to the box C for the swivel, and forming a draft-link for the caster-wheel. It will be noticed that this wheel on my side-hill attachment is placed on the side of the harvester which is opposite to the grain-table wheel Q, and the centers of the grain-table wheel Q, the road-wheel R, and the caster-wheel A are arranged in line. The caster-wheel A is so placed under the deck S that the sheaves discharged therefrom would just fall clear of this wheel.

In machines wherein the frame is not adapted to be raised or lowered the wheel A may be made vertically adjustable in the box C in a suitable manner—for instance, as shown in Fig. 2, in which the stem of the swivel B is formed with a plurality of grooves *s*, and the box C with a set-screw engaging one or the other of said grooves, as desired. When this construction is used, the nut $c$ (shown in Fig. 1) will be dispensed with. Instead of a spiral spring, F, an elliptic spring might be arranged to support the yoke H, and the wheel A might also be arranged to run parallel with the road-wheel R without the swivel.

In the form of machine shown the caster-wheel A may be raised off the ground by raising the frame with the elevating-rack E, and it can be readily detached by unhooking the extension-arm D at $d$ and the link O at P, and unbolting the upper end of the bolt G from the yoke H.

My attachment when in use on a side hill is downhill, and the center of gravity is so kept within the wheel-supports of the machine that it is possible to operate it without danger of upsetting on any hill where horses can keep their footing.

What I claim as my invention is—

1. In combination with the frame of a harvester, a yoke, a wheel connected to said frame on the discharging side of the machine by means of an extension-arm held detachably in place, and a spring-bearing for the said yoke mounted on the arm, the whole adapted to support the outer side of the main frame and of the deck from which the sheaves are discharged when the machine is operating on a side hill, substantially as described.

2. In combination with the frame of a harvester and the binder-table, a caster-wheel adapted to work in a box bolted to the outer end of an extension-arm detachably connected with the main frame, a spring having bearings on said extension-arm, and a yoke, a bolt passing through said extension-arm at one end and rigidly attached to the yoke at the other, and means, substantially as described, provided for holding said yoke in position over the spring, so as to afford a spring-bearing for the outer portion of the frame of the machine on the discharging side, substantially as described, and for the purpose specified.

3. In combination with the frame of a harvester, a vertically-adjustable wheel suitably journaled and connected with the main frame on the discharging side, so that sheaves discharged from the binding-deck will fall immediately outside said wheel, said wheel being ranged in line with the grain-wheel and main wheel, and to afford a spring-bearing for a yoke adapted to uphold the side of the machine on the discharging side, substantially as described, and for the purpose specified.

4. In combination with the main frame of a harvester, the extension-arm D, box C, secured thereto, swivel B, working in said box, wheel A, carried by said swivel, spring F, supported by said arm, bolt G, nut $g$, link O, yoke H, resting on said spring, arms I, braces K, rod N, and deck S, substantially as specified.

5. The combination, with the caster-wheel A, of the box C, in which the swivel B is adapted to work, the extension-arm D, U-shaped at center to receive spiral spring F, having head-block $f$, and bolt G, having nut $g$, the elevating-rack E, casting $p$, bolted to metal portion P of the sill M, link O, bolster H, rod N, braces K, sockets $k$, arms I, saddle L, deck S, and main frame of the machine, substantially as described, and for the purpose specified.

Toronto, August 6, 1887.

WILLIAM RUSSELL.

In presence of—
 CHARLES C. BALDWIN,
 CHAS. H. RICHES.